May 12, 1970  L. HUJIK  3,510,914
MOLDING INJECTION TERMINATION

Filed Feb. 12, 1968  2 Sheets-Sheet 1

INVENTOR
Hujik, Ladislav

BY [signature]

ATTORNEYS

United States Patent Office 3,510,914
Patented May 12, 1970

3,510,914
MOLDING INJECTION TERMINATION
Ladislav Hujik, Batawa, Ontario, Canada, assignor to Bata Shoe Company, Inc., Belcamp, Md.
Filed Feb. 12, 1968, Ser. No. 704,795
Claims priority, application Canada, Feb. 16, 1967, 983,066
Int. Cl. B29f 1/06
U.S. Cl. 18—30                    18 Claims

ABSTRACT OF THE DISCLOSURE

Apparatus for positioning a movable mold member which forms a molding cavity with other cavity-forming mold components, the apparatus including a cylinder having an axially reciprocal piston rod carried thereby. The end of the piston rod projecting from the cylinder has a platform which carries the movable mold member, and the other end of the piston rod carries a piston which coacts with the cylinder. A central rod is contained in an axial bore in the piston rod, the central rod having a piston secured to it and also coacting with the cylinder. Means for adjusting the reciprocal movement of the central rod. A first pressure chamber defined between the piston rod piston and the central rod piston, and a second pressure chamber defined between the central rod piston and the end of the cylinder. Means for introducing and maintaining fluid pressure in both the first and second pressure chambers, and means for exhausting the fluid pressure from the second chamber. Furthermore, the apparatus can carry adjustable means on the platform for activating a microswitch which will terminate the injection of molding material in the molding cavity.

---

Figure 1:
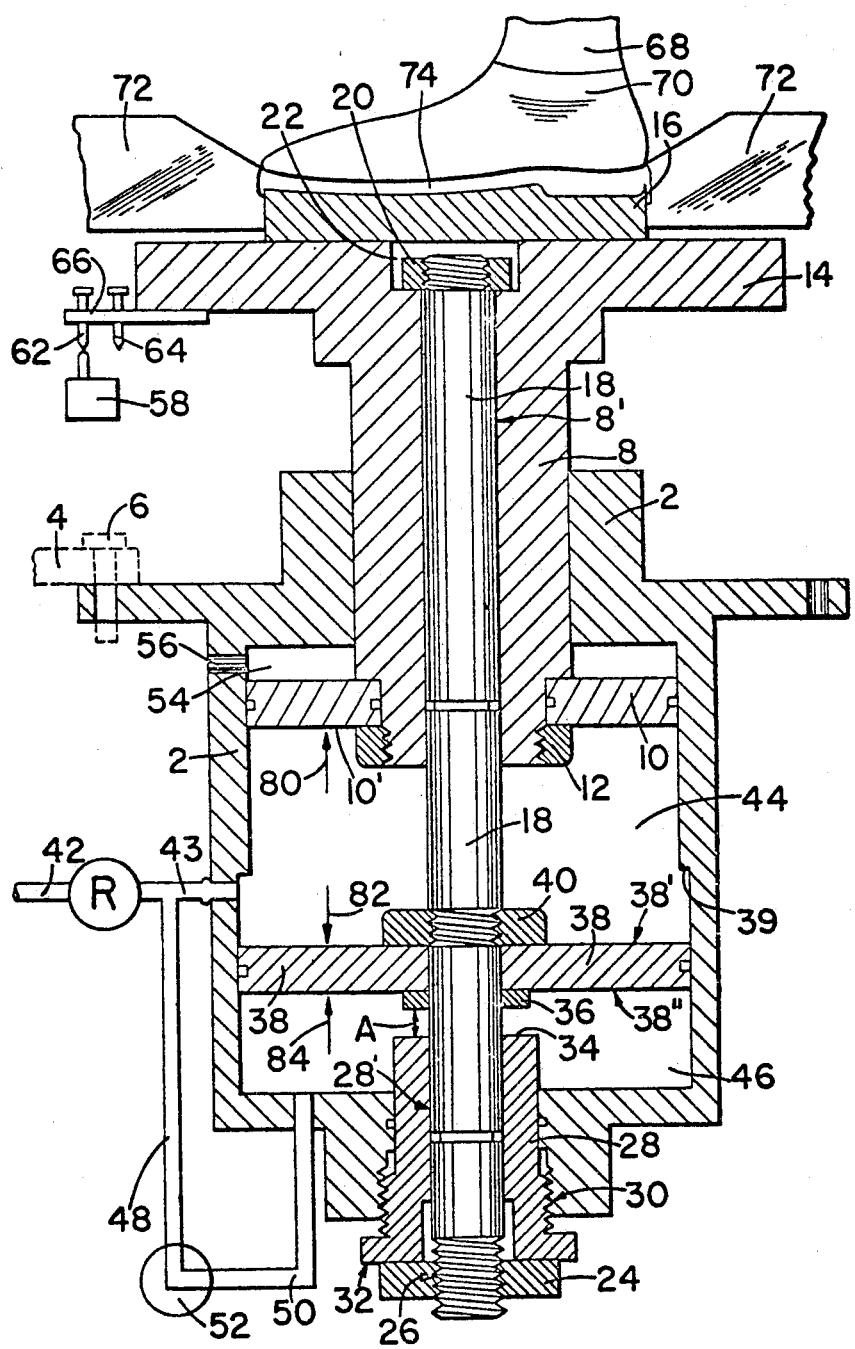

The present invention relates to injection molding apparatus and particularly to apparatus for supporting and positioning a movable mold member forming a molding cavity with the cavity-forming mold components and for automatically terminating the injection of molding material into the cavity during the manufacture of articles of footwear or parts thereof.

It is well known that a sole and/or heel assembly can be injection molded onto a shoe or boot upper placed upon a last member by providing a cavity formed by various mold members adjacent the sole and heel area of the lasted upper and injecting a thermoplastic or thermosetting molding material under pressure into the cavity. The molding material is injected under pressure into the cavity by injection mechanism and it is of critical importance that injection not be terminated until the cavity is completely full, as injection of insufficient material will of course result in an unsatisfactory product.

The mechanism employed to accomplish the injection usually consists of a hollow barrel member having a feed screw carried axially within the barrel and electric motor means for rotating the feed screw to force molding material into the cavity via ports provided in one or more of the molds forming the molding cavity. Injection of material is started by starting the electric drive motor and terminated by stopping the electric motor.

Various attempts at controlling the termination of the injection have been made. One of these proposes mounting one or more of the cavity forming mold members, usually the sole mold portion, on springs whereby when the pressure of the material within the cavity exceeds the force of the springs the mold is urged outwardly against the tension force of the springs during which movement the moving mold member contacts a microswitch to terminate injection. This method is generally satisfactory but has a number of disadvantages. The first of these is that there is no easy way to vary the spring tension, and when molding footwear of various sizes, and also dependent upon the nature of the specific material being injected, it is necessary to change the springs to ones having different compression forces to obtain the desired result. Even when a long run of identical footwear is being produced, spring characteristics vary through use and constant adjustment and replacement of the springs may be found necessary. The replacement of such springs requires at least partial dismantling of the apparatus with resultant decrease in production, and such is also the case when any malfunction of the microswitch occurs as such switch is usually not in an easily accessible position.

The spring loaded movable mold part or parts of the prior art is usually pivotally positioned along one edge or side with the springs urging the other edge or side inwardly with respect to the molding cavity. This of course results in a tilting of the spring-loaded section and may present problems in maintaining the tiltable section in proper alignment with the other segments forming the molding cavity.

The present invention overcomes these disadvantages by providing apparatus whereby one mold member forming the injection molding cavity is maintained in non-tilted position by fluid, such as air, under pressure. The pressure of molding material within the cavity, when it reaches a pressure force above the fluid pressure force, moves the mold member slightly outwardly against the force of fluid pressure, the movement of the mold tripping an easily accessible microswitch to terminate injection of the molding material. With such apparatus it is easy to alter the fluid pressure by conventional pressure regulator means thus presenting a very precise control on the pressure within the cavity necessary to trip the limit switch. This is of great importance when shoes or boots of varying sizes are being molded and when various kinds of molding material are being used, and it presents a distinct advantage over the prior art since it permits injection termination to be controlled by altering the air pressure simply by changing the setting of a fluid pressure regulator valve. Other changes to the apparatus may thereby be rendered unnecessary. The apparatus of the invention povides a very precise control of injection termination not possible heretobefore resulting in increased and more economical production, and allows for easy adjustment of desired sole thickness.

The principal object of the present invention is to provide a simple apparatus for quickly and precisely controlling injection termination on injection molding machines.

A further object is to provide relatively simple and economic apparatus for precisely controlling injection termination on injection molding machines by maintaining a non-tilting mold forming a portion of a molding cavity in position by an easily selected force of fluid pressure whereby an increase in pressure force within the mold cavity above the selected air pressure force will result in slight movement of the said mold to trip a microswitch and effect termination of injection of material into the mold cavity.

It is a further object to provide injection cut-off or termination apparatus of the character described consisting of relatively simple and relatively economically-produced component parts including one or more microswitches, all of which are easily accessible for maintenance and replacement when necessary.

It is still a further object to provide apparatus allowing for simple adjustments of sole thickness.

The apparatus of the present invention may be used on any type of conventional injection molding apparatus such as single station injection machines, or upon the more sophisticated variety wherein a plurality of molding units are positioned on a rotatable table with the table rotating from position to position to bring the molding units in sequence to various operational stations around the table. With these latter type machines it is usual that there are two injection apparatus stations positioned around the table with the first injection apparatus injecting a first molding material into a first formed molding cavity and the second injection apparatus injecting a second molding material into a second cavity formed during travel of the molding unit from the first to the second injection stations. The first and second molding materials may be identical or different as to chemical composition and physical characteristics (such as hardness, resiliency, color, etc.).

The second molding cavity is usually formed by dropping the bottom-most mold (the sole-mold) forming the first molding cavity a short distance after the first injection is complete and the first molding material has "set" to provide a second molding cavity between the "set" first molding material and the dropped bottom-most mold. The dropping of the sole-mold is usually accomplished by supporting the sole-mold on the piston rod of a double-acting cylinder whereby the position of the sole-mold is dependent upon the positioning of the piston within the cylinder.

The present invention provides means for positioning the sole mold with respect to the other mold cavity forming components, and in combination with the injection termination apparatus discussed above presents new and improved apparatus for cavity forming and injection termination.

Precise control of injection termination and precise cavity forming is made possible according to this invention by providing a cylinder having double pistons therein controlled by air pressure force. The piston rod of the first of the pistons carries the sole mold, and the first piston is easily adjusted for maximum upward movement (first cavity forming) and maximum downward movement (second cavity forming). This adjustment is provided by a second piston rod or central rod slidably positioned in an axial bore provided within the first rod. The central rod is also provided with a piston and movement of the second rod and hence control of the positioning of the first rod and sole mold is determined by air pressure force differential on either side of the piston carried by the central rod. Maximum movement of the second rod is accomplished by easily adjusted abutment means providing very precise control over the movement and positioning of the first rod carrying the sole mold.

It is therefore contemplated as part of the present invention to provide means for supporting and positioning a movable mold member forming a molding cavity with other cavity forming molds, and to provide simple and economically produced apparatus for positioning and supporting one mold member forming a molding cavity with other cavity forming molds, and to provide means for terminating injection of molding material into the cavity when the pressure of molding material within the cavity reaches a predetermined level.

The invention also makes provision for apparatus designed to support and position a movable mold member forming a molding cavity with other cavity-forming mold components, the said apparatus comprising a cylinder casing and an axially reciprocal piston rod carried by the cylinder casing, one end of the piston rod projecting from the cylinder and supporting the movable mold member and a piston securely fixed to the piston rod within the cylinder casing, an axial bore in the piston rod and an axially reciprocal central rod slidably positioned within the axial bore and extending into the cylinder casing, and means for restraining movement of the piston rod out of the cylinder with respect to the central rod, and means for adjusting the extent of the reciprocal movement of the central rod, a piston securely fixed to the central rod within the cylinder casing, and a first pressure chamber formed between the piston secured to the piston rod and the piston secured to the central rod, and a second pressure chamber formed between the piston secured to the central rod and the cylinder casing, and means for introducing and maintaining a selected fluid pressure into the first pressure chamber and means for introducing an identical fluid pressure into the second pressure chamber, and means for exhausting the fluid pressure from the second chamber.

Applicant also provides apparatus for supporting and positioning a movable mold member with other cavity-forming mold components to form a molding cavity and into which molding material is injected under pressure by injection mechanism; as well as terminating the injection of the molding material, the said apparatus comprising a pneumatic cylinder casing and a vertical axially reciprocal piston rod carried by the casing, the upper end of the piston rod proecting upwardly out of the casing and supporting the movable mold member, and a piston securely fixed to the lower end of the piston rod within the casing, an axial bore within the piston rod and a vertical axially reciprocal central rod slidably positioned within the axial bore and extending downwardly into the cylinder casing, and means for restraining upward movement of the piston rod with respect to the central rod and means for adjusting the extent of reciprocal movement of the central rod, a piston securely fixed to the central rod within the casing, and a first pressure chamber formed between the piston carried by the piston rod and the piston carried by the central rod, and a second pressure chamber formed between the piston carried by the central rod and the cylinder casing, the surface area of the piston carried by central rod being greater than the surface area of the piston carried by the piston rod, and means for introducing a selected fluid pressure into the first pressure chamber and means for introducing an identical fluid pressure into the second pressure chamber, and means for exhausting the pressure fluid from the second chamber, and microswitch means mounted externally of the casing and adjustable means carried by the piston rod to activate the microswitch means upon downward movement of the piston rod to terminate injection of molding material into the cavity.

Figure 2:
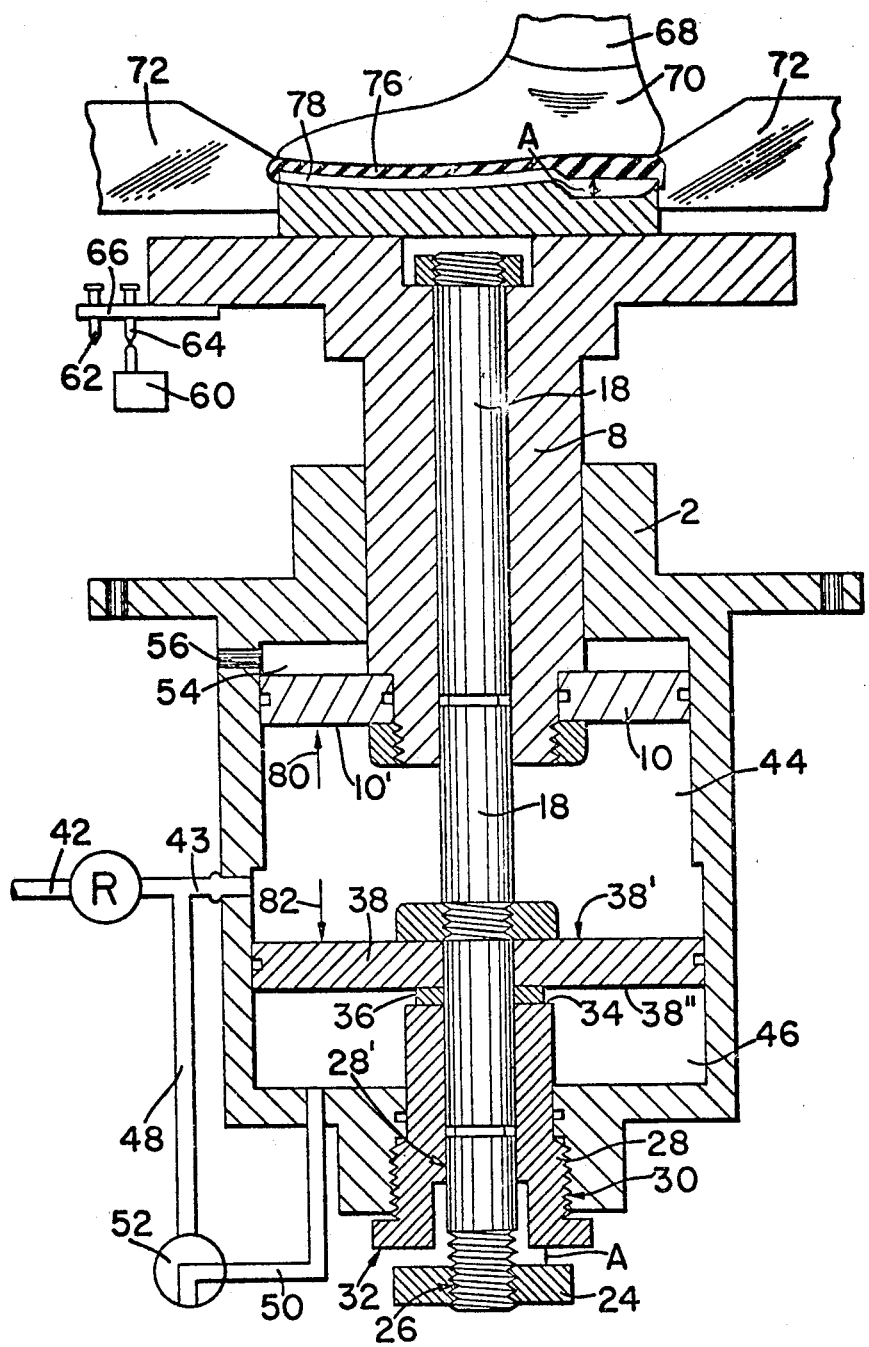

The invention will now be described in detail with reference to the accompanying drawings wherein:

FIG. 1 is a sectional side elevation of apparatus for control of a mold-carrying piston rod incorporating an injection termination control, and shows the apparatus in first cavity-forming position; and FIG. 2 is a view similar to FIG. 1 showing the apparatus in second-cavity forming position.

Referring now particularly to the drawings a cylinder is shown at 2. The cylinder is stationarily mounted on the frame 4 (see FIG. 1) of an injection molding machine by means of bolt 6 or the like. The cylinder 2 carries a piston rod 8 to which is secured a piston 10, by suitable means such as nut 12. The upper end of piston rod 8 is formed as a platform 14 to which a sole-mold 16 may be secured (by means not shown). The mold 16 need not be directly attached to the platform 14 but may be separated therefrom by a spacer plate (not shown) which may be provided with mold heating or cooling apparatus as is known in the art. A second piston rod or central rod 18 is slidably positioned within an axial bore 8′ in piston rod 8. The upper end of central rod 18 is provided with means such as a nut 20 which fits in recess 22 provided in platform 14 to restrict upward movement of the piston rod 8 with respect to the central rod 18. The lower end of central rod 18 is provided with adjustment means such as nut 24 received by threads 26 provided on the rod. At the lower end of the cylinder the central rod 18 is slidably mounted in axial bore 28′ provided in an adjustment sleeve 28 which is adjustable with respect to the cylinder by suitable means such as threading 30. The sleeve 28 has lower abutment shoulders 32 against which nut 24 carried by slidable central rod 18, may abut during upward travel of the rod 18, and upper abutment shoulders 34 against which an abutment ring 36 (which is securely affixed to the rod 18) may abut during downward travel of the rod 18. The vertically reciprocal central rod 18 is provided with a piston 38 secured thereto, and in the drawings this piston 38 is positioned against the fixed abutment ring 36 and held securely thereagainst by means of threaded nut 40.

It will be noted that the interior of the cylinder is provided with a step 39, because of which the area of the upper surface 38′ of piston 38 is greater than the area of the lower surface 10′ of piston 10, for reasons to be described in more detail later.

In the drawings sealing or O-rings are shown but not numbered and their function of course is to prevent fluid escape from one chamber to another or to the outside atmosphere.

Fluid under pressure is conducted from a source (not shown) via line 42 to pressure regulating valve R and hence by line 43 into a first pressure chamber 44 formed between the pistons 10 and 38. Identical fluid pressure is introduced at the same time into a second pressure chamber 46 formed between the piston 38 and the cylinder casing via lines 48 and 50 and flow and exhaust valve 52. In the position shown in FIG. 1 the valve 52 connects lines 48 and 50 with the result that the fluid pressures in chambers 44 and 46 are equal, but in FIG. 2 the valve is turned to seal line 48 and permits the exhaust of fluid pressure from chamber 46 via line 50 as will be described in more detail later.

It will be noted that the chamber 54 formed between the piston 10 and the cylinder casing 2 is vented at 56 to maintain chamber 54 at atmospheric pressure.

The piston rod 8 or platform 14 is provided with means for terminating injection procedure. In the drawings this is accomplished by means of a microswitch 58 (or 60 in FIG. 2) which is stationarily carried by the main frame (not shown) of the molding apparatus. The microswitch 58 (in FIG. 1) is activated to terminate injection by being contacted by an adjustable screw 62 (64 in FIG. 2) carried by flange 66 during any slight downward displacement of the piston rod 8. The screws 62 and 64 may be threadably mounted in flange 66 to enable precise injection termination control.

In the drawings a shoe last 68 upon which a shoe upper 70 has been positioned, is shown in contact with vertically immovable side molds 72. In FIG. 1 a first molding cavity 74 is shown formed between the last 68, side molds 72 and sole-mold 16 and it is into this cavity that the first molding material is injected by conventional injection technique. After the first molding material has "set" (see 76 in FIG. 2) the sole mold is lowered to provide a second molding cavity 78. This is accomplished by exhausting the pressure from the second pressure chamber 46 by exhaust valve 52. Fluid pressure is however maintained in chamber 44.

From the drawings it will be appreciated that the extent of vertical movement of central rod 18 is determined by the relative positioning of adjustment sleeve 28 and adjustment nut 24. Ring 36 is fixed on the rod 18 and downward movement of the rod in the cylinder will depend on the positioning of the sleeve 28 which is in threaded engagement with the cylinder. Upward vertical movement of the rod is governed by nut 24 and of course the positioning of sleeve 28. In FIG. 1 the distance A between ring 36 and shoulders 34 of sleeve 28 will determine the vertical depth of the second molding cavity 78 (see FIG. 2), and desired variations in this thickness of the sole molded in the second cavity 78 can of course easily and precisely be controlled by threading sleeve 28 further into the cylinder with a corresponding threading of nut 24 on rod 18.

The foregoing description is directed specifically to a double injection cycle, but molding using only a single injection can be accomplished with equal facility and rod 18 can be made immovable by (with reference to FIG. 1) screwing sleeve 28 tightly up against ring 36 and then screwing nut 24 tightly against the shoulders 32 on sleeve 28. Alternatively, and with reference to FIG. 2, rod 18 can be made immovable by screwing nut 24 up against the shoulders 32 of sleeve 28, and with ring 36 in contact with shoulders 34.

The operation of the apparatus will be more fully understood from the following operating procedure.

With reference to FIG. 1 a shoe upper 70 to which a sole is to be molded is lasted on last 68 and positioned with reference to the side molds 72. Depending on the size of the article being made and the nature of the material being injected, fluid under a specific pressure is introduced into chambers 44 and 46. The valve 52 is in the through-flow position shown in FIG. 1. The fluid pressure is regulated by regulator R and the pressure introduced is that which experience will have shown to be the pressure force acting upwardly (see arrow 80 in FIG. 1) on piston 10 which must be present to maintain mold 16 in position until the cavity 74 is completely filled with molding material. When the mold cavity is completely filled with pressure force therein will increase above the force exerted by the fluid under pressure in chamber 44 which will result in a slight downward movement of mold 16 to trip the microswitch 58 to terminate injection.

The injection ports provided in the side molds 72 and/or sole mold 16 and through which molding material is introduced into the molding cavities are not shown in the drawings as various arrangements may be employed.

Referring again to FIG. 1 the fluid under pressure introduced into chambers 44 and 46 will exert an upwardly directed force 80 on the surface 10′ of piston 10, and a downwardly directed force 82 on the surface 38′ of piston 38, and an upwardly directed force 84 on the surface 38″ on piston 38. The fluid pressure in chambers 44 and 46 is equal and as the upper 38′ and lower 38″ surfaces of piston 38 are equal in area, force 82 and force 84 will equalize each other and neither force will urge movement of piston 38.

Upward force 80 will therefore urge piston 10, piston rod 8 and mold 16 upwardly in view of the venting of chamber 54. The extent of this upward movement is controlled by central rod 18 and more specifically by nuts 20 and 24 carried thereby. It will be appreciated that the extent of upward movement of rod 18 and mold 16 may easily be regulated by selective positioning of nut 24 and/or sleeve 28 and/or nut 20. Thus the depth of cavity 74 may readily be adjusted.

The injection of molding material into cavity 74 is then commenced by conventional means, and when the force exerted downwardly on mold 16 by the molding material in the cavity 74 exceeds the upward force 80 on piston 10 the mold 16 will be displaced slightly downwardly causing screw 62 to contact switch 58 to terminate injection, as described above.

When only one injection is desired after the "setting" of the material in cavity 74 the last 68 carrying an upper 70 and a sole mold fastened thereto is removed and a new lasted upper placed in position and the molding procedure repeated.

When however it is desired to inject a second molding material, valve 52 is opened (see FIG. 2) to exhaust the air pressure from the second chamber 46 thus relieving force 84. The fluid pressure is maintained in the first chamber 44, and as the upper surface area of piston 38 is greater than the lower surface area of piston 10 (in view of the step 39 provided in the interior surface of the cylinder casing) force 82 will dominate over force 80 and piston 38 will be urged downwardly and will carry with it rod 8 and sole mold 16 because of the contact of nut 20 in the recess 22 of platform 14. The downward movement of rod 18 and sole mold 16 will be terminated by ring 36 abutting against shoulders 34 of sleeve 28. See FIG. 2.

The lowering of the sole mold 16 results in the formation of the second molding cavity 78 into which a second molding molding material is injected. This injection will continue until the downward force of the material in cavity 78 exceeds the upward force 80 at which time screw 64 contacts switch 60 to terminate further injection.

After setting of the material in cavity 78, the lasted upper is removed and valve 52 is turned to the position shown in FIG. 1 to again introduce fluid pressure into second chamber 46 resulting in an upward movement of sole mold 16 to the first cavity 74 forming position.

In the drawings two microswitches and two microswitch actuating screws 62 and 64 are shown. When the apparatus of the present invention is used on equipment consisting of a plurality of molding units positioned on a rotatable table, and having two injection mechanisms for double injection a microswitch will be positioned on the main frame of the turn-table apparatus at each of the two injection stations; and while both of the switches may be operated by only a single adjustment screw (such as 62) carried by the piston rod 8, it has been found preferable to employ two screws such as shown in the drawings one to operate each of the microswitches to obtain precise adjustment of injection termination control.

When the unit of the invention is being used on a single station molding machine for a double molding material injection two microswitches may be mounted side by side, one switch being contacted by one adjusting screw to terminate the first injection and the second switch being contacted by a second adjusting screw to terminate the second injection. Alternatively a single microswitch having double contact points and activated by a single adjustment screw could be used.

When the unit of the invention is being used for single injection only a single switch and single microswitch actuating screw are all that is required.

Variations of the microswitch arrangement and actuation is of course possible without departing from the scope of the invention.

Other variations in the construction of the apparatus are also possible. For example, fluid pressure could be introduced into the cylinder at only one point that being into chamber 46, in which case a one-way pressure valve would be provided in piston 38 and would permit fluid under pressure to pass from second chamber 46 into first chamber 44 but not in the reverse direction; and by providing a valve for selectively exhausting pressure from chamber 46, the operation of the unit would be as described above. This latter embodiment is not shown in the drawings.

The embodiments of the invention in which an exclusive property or privilege is claimed are defined as follows:

1. Apparatus for supporting and positioning a movable mold member forming a molding cavity with other cavity-forming mold components, said apparatus comprising a cylinder casing and an axially reciprocal piston rod carried by the cylinder casing, one end of the piston rod projecting from the cylinder formed as a platform and supporting the movable mold member, a piston securely fixed to the piston rod within the cylinder casing, an axial bore in the piston rod and an axially reciprocal central rod slidably positioned within the axial bore and extending into the cylinder casing, means for restraining movement of the piston rod out of the cylinder with respect to the central rod, means for adjusting the extent of the reciprocal movement of the central rod, a piston securely fixed to the central rod within the cylinder casing, and a first pressure chamber defined between the piston secured to the piston rod and the piston secured to the central rod, and a second pressure chamber defined between the piston secured to the central rod and the cylinder casing, means for introducing and maintaining a selected fluid pressure into the first pressure chamber, means for introducing an identical fluid pressure into the second pressure chamber, and means for exhausting the fluid pressure from the second chamber.

2. Apparatus according to claim 1 further comprising microswitch means, and adjustable means carried by the platform for activating the microswitch means whereby movement of the piston rod into the cylinder will terminate injection of molding material into the molding cavity.

3. Apparatus according to claim 1 further comprising a chamber formed between the piston carried by the piston rod and the cylinder casing which chamber is vented to atmospheric pressure.

4. Apparatus according to claim 1 wherein the effective surface area of the piston carried by the central rod is greater than the surface area of the piston carried by the piston rod.

5. Apparatus according to claim 1 further comprising means for adjusting the extent of reciprocal movement of the central rod at the end of the central rod remote from the piston rod projecting through the cylinder casing, which means consists of a sleeve threadedly and axially adjustably secured to the casing, an axial bore being provided in the sleeve to receive the central rod, abutment shoulders on the end of the sleeve interior of the casing for abutment with a fixed ring carried by the central rod, and abutment shoulders on the end of the sleeve exterior of the casing for abutment with an adjustable nut threadedly carried by the end of the central rod.

6. Apparatus according to claim 1 wherein the piston rod is restrained against movement out of the casing with respect to the central rod by means of a shoulder or abutment formed in the piston rod acting against means mounted on the central rod.

7. Apparatus according to claim 1 wherein the movable mold member is a sole mold.

8. Apparatus according to claim 2 wherein the microswitch means comprises two microswitches, two adjustable screws being carried by the platform for activating the microswitch means.

9. Apparatus according to claim 1, wherein the means for adjusting the reciprocal movement of the central rod may be adjusted to prevent any reciprocal movement of said central rod.

10. Apparatus according to claim 1 further comprising means for regulating the fluid pressure introduced into the pressure chambers.

11. Apparatus for supporting and positioning a movable mold member forming a molding cavity with other cavity-forming mold components and into which molding material is to be injected under pressure by means of injection mechanism, and for terminating the injection of the molding material, said apparatus comprising a cylinder casing and a vertical axially reciprocal piston rod carried by the casing, the upper end of the piston rod projecting upwardly out of the casing formed as a platform and supporting the movable mold member, and a piston securely fixed to the lower end of the piston rod within the casing, an axial bore within the piston rod and a vertical axially reciprocal central rod slidably positioned within the axial bore and extending downwardly into the cylinder casing, means for restraining upward movement of the piston rod with respect to the central rod, means for adjusting the extent of reciprocal movement of the central rod, a piston securely fixed to the central rod within the casing, a first pressure chamber defined between the piston carried by the piston rod and the piston carried by the central rod, and a second pressure chamber defined between the piston carried by the central rod and the cylinder casing, the effective surface area of the piston carried by central rod being greater than the effective surface area of the piston carried by the piston rod, means for introducing and maintaining a selected fluid pressure force into the first pressure chamber, means for introducing an identical fluid pressure into the second pressure chamber, means for exhausting the pressure from the second chamber, mircoswitch means mounted externally of the casing, and adjustable means carried by the platform to activate the microswitch means upon downward movement of the piston rod to terminate injection of molding material into the cavity.

12. Apparatus according to claim 11 further comprising a chamber formed between the piston carried by the piston rod and the cylinder casing which chamber is vented to atmospheric pressure.

13. Apparatus according to claim 11 further comprising means for adjusting the extent of reciprocal movement of the central rod at the lower end of the central rod projecting downwardly through the cylinder casing which means consists of a vertically adjustable sleeve threadedly secured to the casing, an axial bore in the sleeve to slidably receive the central rod, shoulders on the upper end of the sleeve for abutment with a fixed ring carried by the central rod, and abutment shoulders on the lower end of the sleeve for abutment with an adjustable nut threadedly carried by the end of the rod.

14. Apparatus according to claim 11 wherein the piston rod is restrained from movement out of the casing with respect to the central rod by means of a shoulder or abutment carried by the piston rod acting in conjunction with means secured to said central rod.

15. Apparatus according to claim 11 wherein the movable mold member is a sole mold.

16. Apparatus according to claim 11 wherein the microswitch means consists of two microswitches and the adjustable means carried by the platform for activating the microswitch means are two adjustable screws.

17. Apparatus according to claim 11 wherein the means for adjusting the reciprocal movement of the central rod may be adjusted to prevent any reciprocal movement of said central rod.

18. Apparatus according to claim 11 further comprising means for regulating the fluid pressure introduced into the pressure chambers.

References Cited
UNITED STATES PATENTS

| | | |
|---|---|---|
| 2,465,204 | 3/1949 | Dalton. |
| 3,267,520 | 8/1966 | Ludwig. |
| 3,425,094 | 2/1969 | Ludwig. |

J. SPENCER OVERHOLSER, Primary Examiner

M. O. SUTTON, Assistant Examiner

U.S. Cl. X.R.

18—17, 34